(12) United States Patent
Heuchert et al.

(10) Patent No.: US 7,380,084 B2
(45) Date of Patent: May 27, 2008

(54) DYNAMIC DETECTION OF BLOCK BOUNDARIES ON MEMORY READS

(75) Inventors: Mark Heuchert, Sunnyvale, CA (US); Anujan Varma, Cupertino, CA (US); Ashish Karandikar, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 220 days.

(21) Appl. No.: 11/240,854

(22) Filed: Sep. 30, 2005

(65) Prior Publication Data

US 2007/0079104 A1 Apr. 5, 2007

(51) Int. Cl.
G06F 12/00 (2006.01)
G06F 13/00 (2006.01)
G06F 13/28 (2006.01)
G06F 9/26 (2006.01)
G06F 9/34 (2006.01)

(52) U.S. Cl. ........................ 711/167; 711/154; 711/169; 711/170; 711/201; 711/217

(58) Field of Classification Search ................. 711/167
See application file for complete search history.

(56) References Cited

U.S. PATENT DOCUMENTS

| 6,041,067 A * | 3/2000 | Takamori et al. ........... 370/514 |
| 6,941,433 B1 * | 9/2005 | Libby et al. ................ 711/167 |
| 2002/0184461 A1 * | 12/2002 | Zumkehr .................... 711/167 |
| 2005/0005082 A1 * | 1/2005 | Au et al. .................... 711/170 |
| 2007/0008791 A1 * | 1/2007 | Butt et al. .................. 365/193 |

* cited by examiner

Primary Examiner—Donald Sparks
Assistant Examiner—Ryan Bertram
(74) Attorney, Agent, or Firm—Douglas J. Ryder; Ryder IP Law

(57) ABSTRACT

In some embodiments a processing device is disclosed. The processing device is configured to read data from a memory device. The processing device transmits a read request to the memory device for a data block at a certain address and reads the data block for the certain address from the memory device. The processing device dynamically detects boundaries for the data block read by detecting an alignment pattern in data received from the memory device. Other embodiments are otherwise disclosed herein.

13 Claims, 9 Drawing Sheets

DYNAMIC DETECTION OF BLOCK BOUNDARIES ON MEMORY READS

BACKGROUND

Storing and forwarding of data is a common function in equipment used in packet-based communication networks. A key part of such store-and-forward systems is the queuing of incoming data into memory, followed by the subsequent de-queuing of the data, before sending to its destination. In high-speed store-and-forward devices (e.g., switches, routers), this function is typically implemented in hardware, consisting of digital logic (e.g., application specific integrated circuit (ASIC), field-programmable gate array (FPGA)) in conjunction with memory (e.g., semiconductor memory) that holds the packet data and control information for the queues.

To achieve full throughput in a high-speed store-and-forward device (e.g., switch or router), the queuing and de-queuing operations need to be executed in a pipeline. Pipeline operations entail queuing and de-queuing operations being initiated in every clock cycle. The pipelined operations may be based on single-edge clocking (single read/write per clock cycle) or dual-edge clocking (read/write on both rising and falling edge of clock). Modern memory technologies, such as double data rate (DDR) and quad data rate (QDR) memories support dual-edge pipelined operation. QDR memory devices have two data ports, one for reads and the other for writes, which enable a read and a write operation to be performed in parallel. Although the pipelined memory devices, such as QDR and DDR, support very high throughputs, they have long latencies. That is, a read operation must wait for several clock cycles from starting the operation before data becomes available for the device. Similarly, a write operation takes several cycles for the data to be updated in memory.

For high-speed operations, the read interface of the memory device is typically designed as a source-synchronous interface (a clock signal is carried along side the data from a driving point to a receiving point). The processing device supplies an input clock to the memory device and the memory device uses the input clock for latching the address for a read operation. Because of the delays within the device, the data may not be in phase with the input clock. Therefore, the memory device retimes the input clock to be in phase with the data. As an alternative to the memory device retiming the incoming clock and transmitting as a separate clock signal, the incoming clock can be delayed by external means to align its phase with respect to the data transmitted to the processing device.

The retimed clock/delayed clock (clock signal) is then transferred alongside the data from the memory device to the processing device. The processing device can use the clock signal to clock the data into an input register. The clock signal may have the same frequency as an internal clock of the processing device, but its phase may be arbitrary with respect to the internal clock. By matching the delay of the path of the clock signal to the delay of the data signals, the processing device can clock the data into the register precisely at the right time, when data is valid. The data latched by the processing device from the read operation needs to be further synchronized to its local clock before it can be used by the logic within the processing device. If all the delays associated with the memory read operation are constant, this synchronization can be achieved by reading the output of the latch with the local clock n cycles after starting the read operation, where the value of n is chosen to account for all the delays in the read path (pipelining delays, propagation delays of signals, and latency of memory device).

In many practical applications, it is difficult to predict the total delay in the read path accurately, as it depends on the propagation delays of the signals. In addition, the delay may change dynamically during system operation as a result of process, voltage and/or temperature (PVT) changes. Thus, it is difficult to determine exactly the clock cycle in which the first word of a block read from memory is latched into the input latch in the processing device after the read operation begins. Detecting the boundary of valid data is exacerbated when multiple memory devices are used in parallel to increase the bandwidth of the memory interface. In such a system, a data word from the processing device is broken up into sub-words and each sub-word is stored in a separate memory device. For example, if the processing device processes data as 128-bit words and the size of the memory word is 32 bits, then four memory devices can be used in parallel to enable the processor to read and write data in 128-bit words. These four devices storing the sub-words are sometimes referred to as banks, and such a memory system as banked memory. In this example, banking quadruples the transfer rate between the processing device and memory.

When data stored in multiple memory devices are read in parallel, the devices independently perform retiming of the incoming clock and provide an outgoing clock. This clock is then carried along with its sub-word of data, and is used by the processing device to clock in the sub-word. Because the propagation delays of the signals associated with each of the memory devices may not be identical, the retimed clocks provided by the memory devices may not be in phase with each other. Thus, when the incoming data is latched by the processing device, each sub-word may be latched at a different time. As in the case of a single memory device, these time instants can also vary during system operation with changes in PVT.

BRIEF DESCRIPTION OF THE DRAWINGS

The features and advantages of the various embodiments will become apparent from the following detailed description in which.

DETAILED DESCRIPTION

Figure 1:
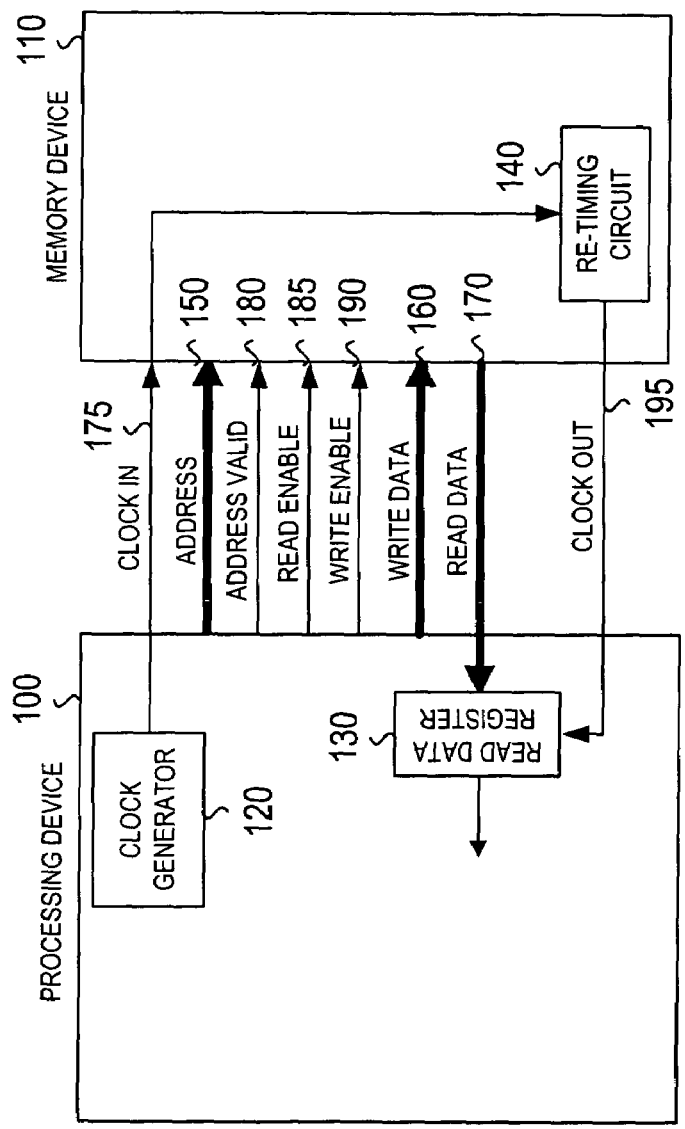
FIG. 1 illustrates an example interface between a processing device and a pipelined memory device, according to one embodiment.

FIG. 1 illustrates an example interface between a processing device 100 and a pipelined memory device 110. The processing device 100 is a hardware device, such as an application specific integrated circuit (ASIC) or field-programmable gate array (FPGA). The processing device 100 initiates read and write operations with the memory device 110 in order to perform its function of storing and forwarding packets and/or their associated control information. The memory device 110 is a pipelined memory device. The memory device may employ single-edge clocking (read/writes on one edge of clock) or dual-edge clocking (reads/writes on both edges of clock). Examples of dual-edge clock memories are double-data-rate (DDR) memory devices or quad data rate (QDR) memory devices. The processing device 100 includes a clock generator 120 and a read data register 130. The memory device 110 includes a re-timing circuit 140. The interface includes a common address bus 150, a write data bus 160 and a read data bus 170. The operation of the interface is synchronous with respect to a clock.

The clock generator 120 within the processing device 100 provides an input clock signal 175 to the memory device 110. The clock in signal 175 is used to latch data received from the processing device 100. The address bus 150 transmits the address of the data, as well as an address valid signal 180, a read enable signal 185 and a write enable signal 190. The address valid signal 180, when activated, indicates to the memory device 110 that there is a valid address on the address bus 150. The read enable signal 185, when activated, instructs the memory device 110 to read data from the address indicated. The write enable signal 190, when activated, instructs the memory device 110 that the processing device 100 is going to write data to the associated address. It should be noted that the address valid signal 180 is optional, as the read enable signal 185 or the write enable signal 190 can be used to indicate a valid address on the address bus 150.

The write data bus 160 transmits the data to be written to the associated address within the memory device 110. The read data bus 170 transmits the data read from the associated address to the processing device 100. The retiming circuit 140 receives the clock in signal 175 from the processing device 100 and uses it to generate a clock out signal 195 that it transmits to the read data register 130 within the processing device 100.

Figure 2:
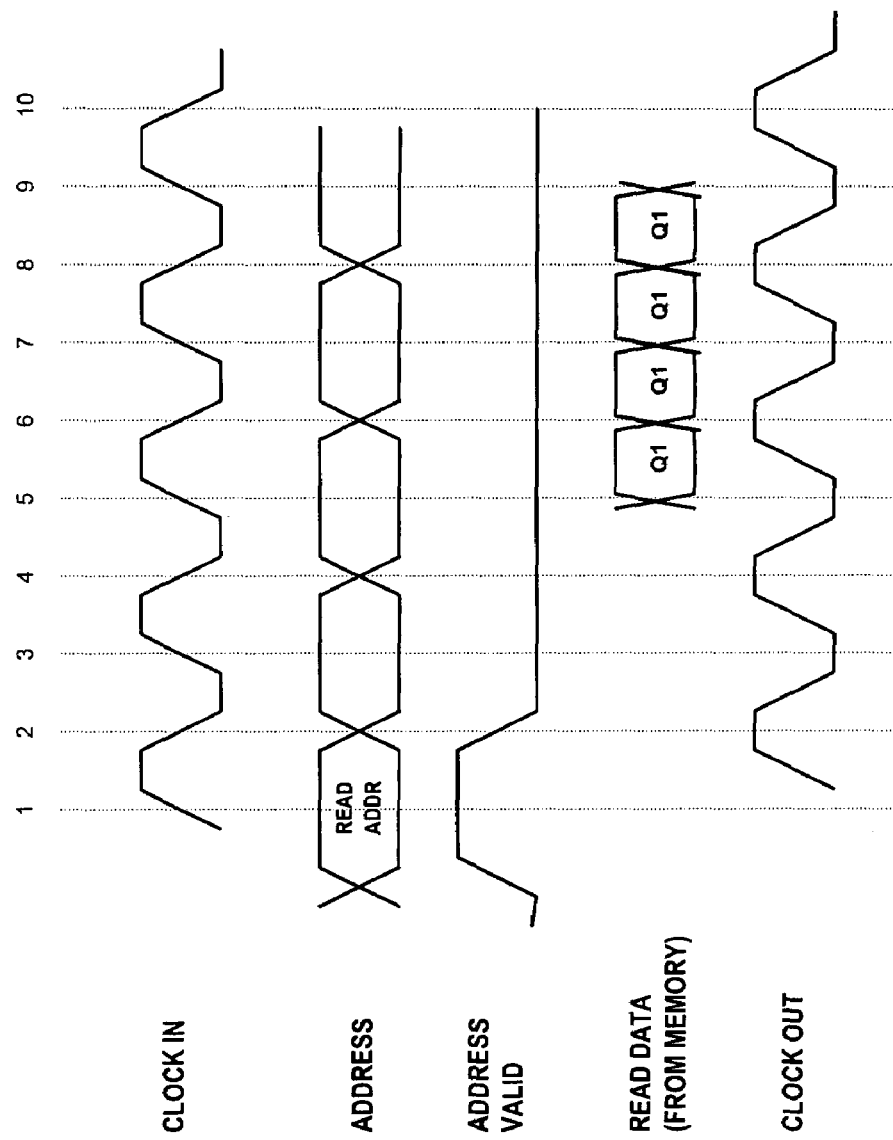
FIG. 2 illustrates an example operational timing diagram for reading data from a pipelined memory device, according to one embodiment.

FIG. 2 illustrates an example timing diagram for a read operation for a dual-edge clocking (DDR/QDR) memory device (e.g., 110 of FIG. 1). Since the memory is a DDR/QDR device, the timing diagram accordingly identifies consecutive clock edges (e.g., rising, falling). The timing diagram includes a clock in, an address, an address valid, a read data, and a clock out. The timing diagram will be described with respect to FIG. 1. Each read operation may read a block of data from the memory device 110, which is transferred across the read data bus 170 during consecutive edges of the clock.

The read operation starts with the processing device 100 transmitting an address associated with a data block to be read via the address bus 150 to the memory device 110. In addition, the processing device 100 activates the address valid signal 180 to indicate to the memory device 110 that the address on the address bus 150 is valid. Once the memory device 110 receives the address valid signal 180, the memory device 110 latches the address received on the next edge of the clock in signal 175. As illustrated, the address valid signal is active so that when the address is received on clock edge 1 (rising edge) the address is latched into the memory device 110.

After the read operation is started, data will be available on the read data bus 170 after a certain number of clock edges (as specified by the memory device 110). This delay encompasses the time taken by the memory device 110 to access its internal memory array to retrieve the data, as well as the various data path delays involved in transferring the data to the read data bus 170. As illustrated the data associated with the read address that was latched by the memory device on clock edge 1 is available on the read data bus on clock edge 5. The data block is transferred one word at a time over the read data bus 170, during consecutive edges of the clock. As illustrated, the data block (Q1) is transferred in four consecutive clock edges 5, 6, 7, 8 because the size of the block is four times the width of the read data bus 170.

The exemplary memory device 110 employs a source-synchronous interface for transferring the data read from a memory address to the processing device 100. The processing device 100 supplies the clock in signal 175 (an input clock) to the memory device 110. The memory device 110 uses the clock in signal 175 for latching the address for the read operation. Because of the delays within the memory device 110, the data appearing on the read data bus 170 may not be in phase with the clock in signal 175. Therefore, the memory device 110 retimes the clock in signal 175 to be in phase with the data presented on the read data bus 170, and provides the retimed clock as the clock out signal 195. The clock out signal 195 is then transferred alongside the data, and is used by the processing device 100 as the clock to latch the data. As illustrated in FIG. 2, the clock out signal 195 has the same frequency as the clock in signal 175 but its phase is shifted (can be arbitrary) with respect to the clock in signal 175.

Figure 3:
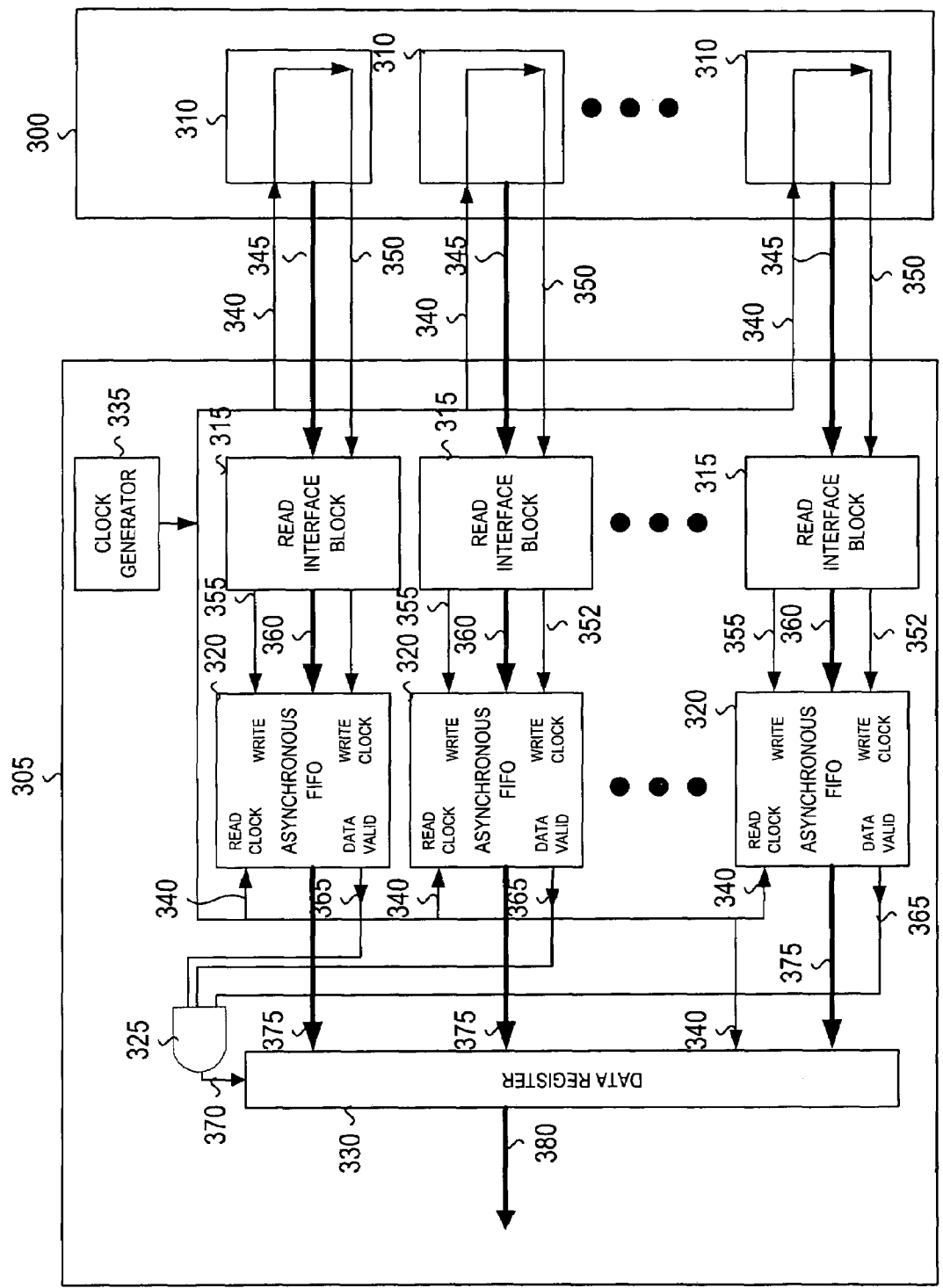
FIG. 3 illustrates an example interface between a pipelined memory device and a processing device, according to one embodiment.

FIG. 3 illustrates an example interface between a pipelined memory device 300 and a processing device 305. The pipelined memory device 300 includes one or more memory devices (banks) 310 operating in parallel. The processing device 305 includes one or more read interface blocks 315, one or more asynchronous FIFOs 320, a logical AND gate 325, a data register 330, and a clock generator 335. The memory banks 310 may be synchronous pipelined devices that employ single-edge clocking or dual-edge clocking (e.g., DDR, QDR). The memory banks 310 store data from the processing device 305 in a striped fashion. That is, the data word from the processor device 305 is broken up into groups of bits called sub-words, and the sub-words are stored in distinct memory banks 310. The sub-words are n bits wide and there are M banks of memory devices. When the memory banks 310 employ single-edge clocking, the memory banks 310 transmit an n-bit sub-word in each clock cycle so that a combined word size is n×Mbits. When the memory banks 310 employ dual-edge (DDR/QDR) clocking, the memory banks 310 transmit an n-bit sub-word on each clock edge (positive or negative) so that the combined word size is 2×n×Mbits.

The memory banks 310 receive an input clock (clock in) 340 from the clock generator 335. During a read operation, the memory banks 310 supply their sub-words (n bits) in parallel to the read interface blocks 315 over read data buses 345 (n-bit buses). The memory banks 310 also supply re-timed clocks (clock out) 350. The re-timed clocks 350 can be generated by the memory banks 310 by either modifying the phase of the input clock 340, or externally by delaying the input clock 340 by an appropriate amount to align itself with the phase of the sub-word forward from the memory bank 310. The sub-words may arrive at the processing device 305 at an arbitrary phase with respect to the other sub-words.

The data stored in the memory device 300 is in the form of blocks, where each block represents a packet or a fragment of a packet that is formatted by the processing device 305. The block size is the number of sub-words read from the memory device 300 during a given read cycle. That is, the block size is n×M×w bits, where w is the number of sub-words transferred from each memory bank 310 in a given read operation (cycle).

Figure 4A:
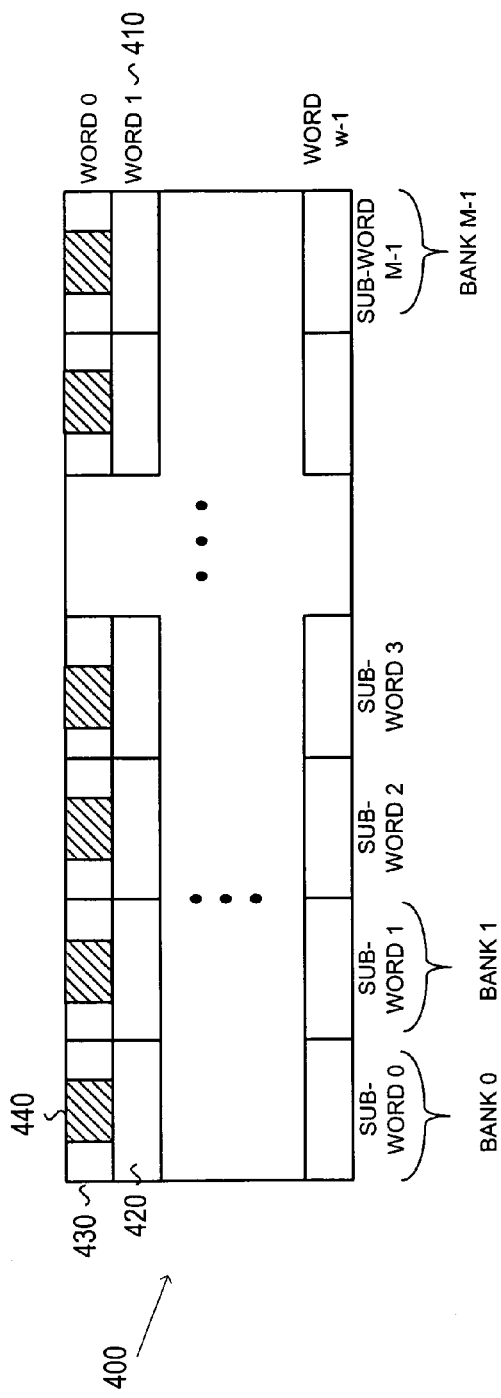
FIGS. 4A and 4B illustrate example formats of blocks of data for single-edge clocking memory devices and dual-edge clocking memory devices respectively, according to one embodiment.

FIG. 4A illustrates an example format of a block 400 from a memory device employing single-edge clocking. The block 400 is made up of a plurality of words 410 with each word made up of a plurality of sub-words 420. A sub-word 420 will be read from each of M memory bank (labeled 0 to M-1) during a clock cycle. Each word 410 includes M sub-words 420 (labeled 0 to M-1). A total of w words 410 (labeled 0 to w-1) make up the block 400. A header 430 occupies the first sub-word read from each memory bank so that the header 430 occupies the first M×n bits of the block 400. The header 430 contains identifying information about the block 400 and an alignment pattern 440. The alignment pattern 440 is a contiguous sequence of bits. It can be one bit at a minimum, with a value (0 or 1) that can be distinguished from the state of the data bus lines when there is no valid data on them. More bits can be used to increase the reliability of detection, for example, alternating patterns of 0s and 1s.

Figure 4B:
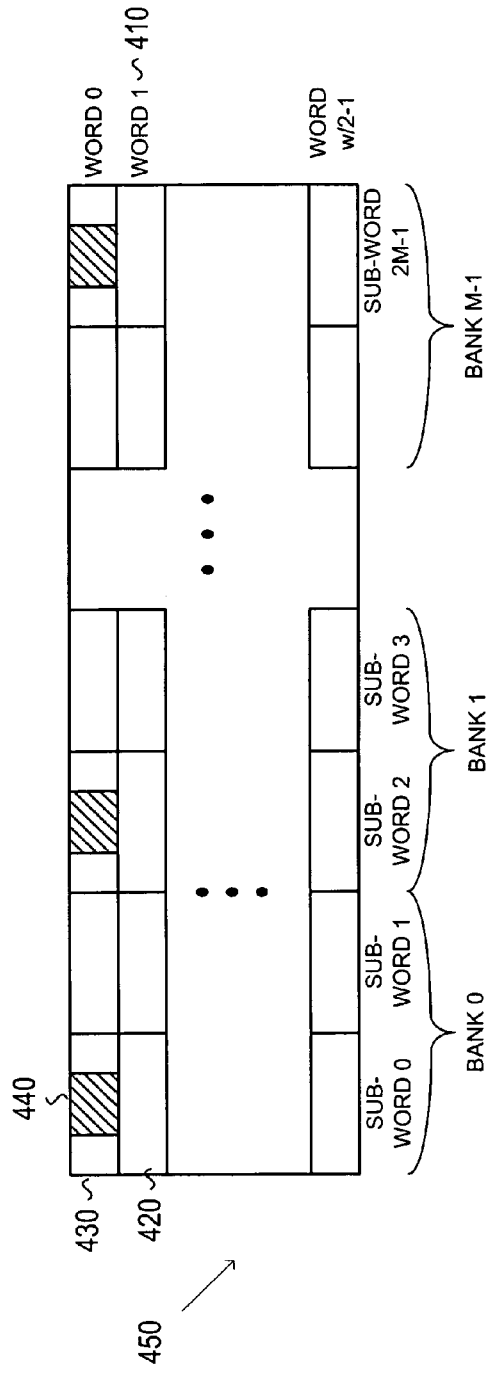

FIG. 4B illustrates an example format of a block 450 from a memory device employing dual-edge (DDR/QDR) clocking. For such a memory device two sub-words 420 will be read from each memory bank during a clock cycle, one of the rising edge and one on the falling edge. Accordingly, each word 410 includes 2M sub-words 420 (labeled 0 to 2M-1). A total of w/2 words 410 (labeled 0 to w/2-1) make up the block 450. The header 430 occupies the first two sub-words read from each memory bank so that the header 430 occupies the first M×2n bits of the block 450. The header 430 includes the alignment pattern 440 in the first sub-word 420 read from each memory bank. Thus, when data is read out from the memory banks the first valid sub-word 420 read out from each memory bank will contain an instance of the alignment pattern 440 and the first word (word 0) 410 will include M instances of the alignment pattern 440.

Referring back to FIG. 3, during a read operation the read interface blocks 315 receive the sub-words and the retimed clock (clock out) 350. Depending on the type of clocking (single-edge or dual-edge), the read interface blocks 315 will receive either one or two n-bit sub-words over the read data buses 345 each clock cycle. The read interface blocks 315 assert a data valid signal 355 once the sub-word(s) received during a clock cycle are validated. For DDR/QDR memory devices, the read interface blocks 315 will assemble the two consecutive n-bit sub-words into 2n-bit sub-words and once a 2n-bit word is present and valid at the output of the read interface block 315 the data valid signal 355 is asserted. That is, the data valid signal 355 is first asserted when the first sub-word(s) of a data block are presented at the output of the read interface block 315 and the data valid signal 355 remains asserted until the entire data block is transferred.

It should be noted that the retimed clocks 350 received from the memory blocks 310 may be out of phase with each other as they may traverse paths with different propagation delays. Accordingly, the data blocks arriving at the read interface blocks 315 may not be aligned with each other and the words appearing at the output of the read interface blocks 315 accordingly may not be in alignment. For example, during a read operation some of the read interface blocks 315 may present the first sub-word (whether n-bits or 2n-bits) of the data block in a certain clock cycle, while others may present their first sub-word in following clock cycles. The data valid signal 355 for a particular read interface block 315 indicates when a valid sub-word is ready to be forwarded from the read interface block 315.

The asynchronous FIFOs 320 receive the sub-words (n-bits or 2n-bits) from the read interface blocks 315 over a data bus 360 (n-bit bus for memory with single-edge clocking, or 2n-bit bus for DDR/QDR memory). The asynchronous FIFOs 320 also receive a deskewed clock 352 from the read interface block at a write clock input and the data valid signal 355 at a write input. When the data valid signal 355 is active the sub-words are written into the asynchronous FIFOs 320 using the deskewed clock 352. That is, the sub-words appearing at the output of the read interface block 315 are written into the corresponding asynchronous FIFO 320 during each clock cycle when the data valid signal 355 is asserted, and no data is written into the asynchronous FIFO 320 when the data valid signal 355 is de-asserted.

The asynchronous FIFOs 320 assert a FIFO valid signal 365 when one or more sub-words (n-bits or 2n-bits) are stored therein. The logical AND 325 receives the FIFO valid signals 365 from the FIFOs 320 and generates a word valid signal 370. The word valid signal 370 becomes active only when all the FIFO valid signals 365 are active (e.g., all the asynchronous FIFOs 320 contain valid data). When the word valid signal 370 is active, the sub-words stored in each of the asynchronous FIFOs 320 are read out of the FIFOs 320 over a data bus (n-bit or 2n-bit bus) 375 into the data register 330. The reads from the asynchronous FIFOs 320 are performed using the common internal reference clock (clock in) 340 from the clock generator 335 which is received at a read clock input of the FIFOs 320. Thus, in addition to performing the sub-word alignment function, the asynchronous FIFOs 320 also facilitate the conversion of the clock domain for the data read out from memory without any data loss.

The data register 330 receives the sub-words (n-bits or 2n-bits) from each of the M FIFOs 320 and assembles words (either n×M or 2n×Mbits long). The data register 330 supplies the words to internal logic in the processing device 305 via a data bus (n×M or 2n×M bit bus) 380 based on the internal reference clock 340 that is provided to the data register 330. The data register 330 may forward the words in a clock cycle after the word valid signal 370 is activated (data alignment is reached). The words will continue to be forwarded until all the words (w or w/2) of the packet or packet fragment are transferred.

Figure 5A:
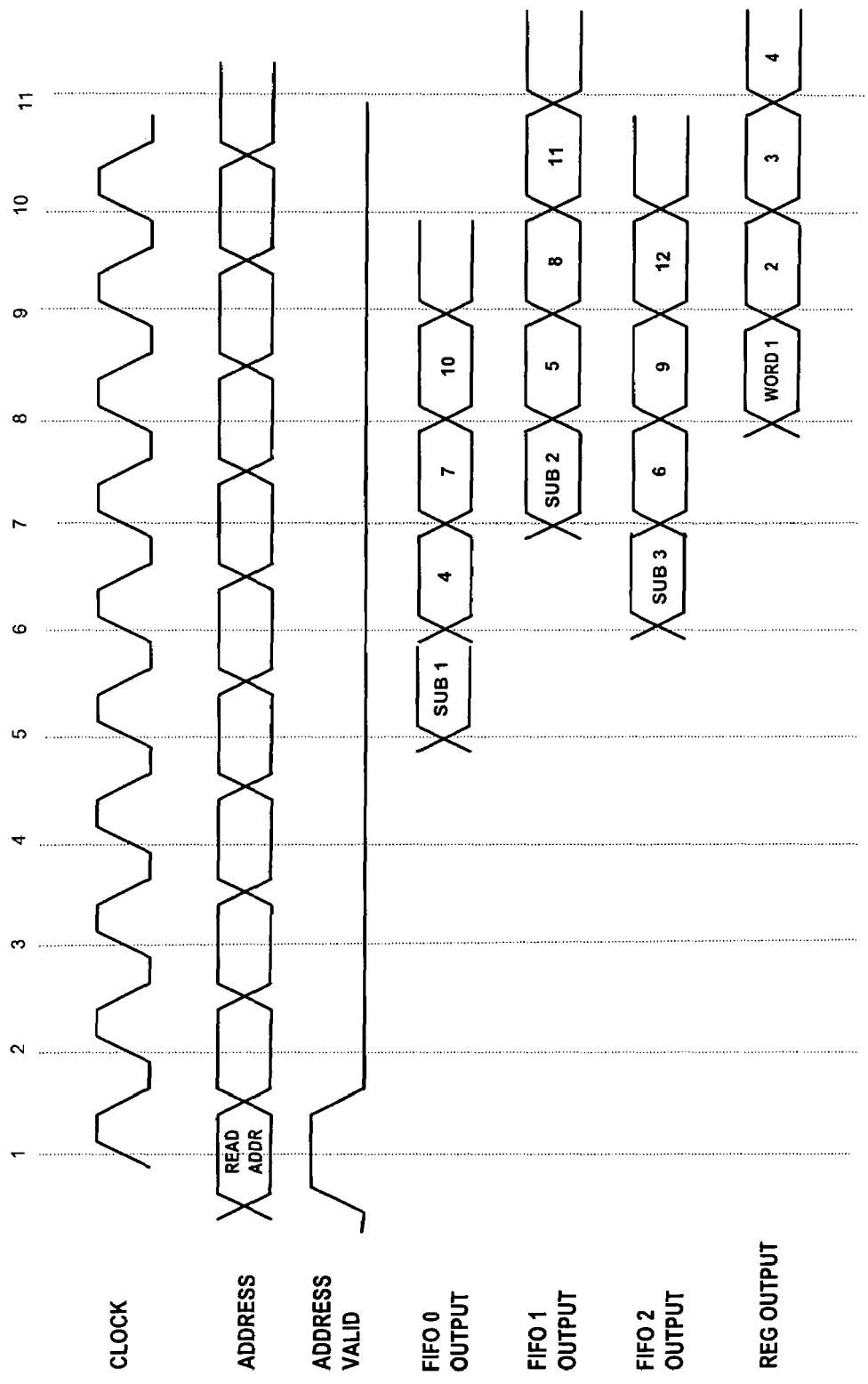
FIGS. 5A and 5B illustrate example operational timing diagrams for reading data from single-edge clocking memory devices and dual-edge clocking memory devices respectively, according to one embodiment.

FIG. 5A illustrates an example timing diagram for a read operation of the system of FIG. 3, assuming that the memory device employs single-edge clocking (transmitting one word each clock cycle) with three memory banks. The timing diagram includes a clock signal 340, an address, an address valid signal, FIFO output 375 for FIFOs 0-2, and a register output 380. An address is placed on the memory address bus on each rising edge of the clock. The first address is sent out on the first rising edge. As illustrated, the first sub-word (SUB 1) is available for reading at an output of FIFO 0 on rising edge 5, the second sub-word (SUB 2) is available for reading at an output of FIFO 1 on rising edge 7, and the third sub-word (SUB 3) is available for reading at an output of FIFO 2 on rising edge 6. Thus, all of the sub-words are available for reading at rising edge 7 and are clocked into the register 330 by clock edge 8. The register 330 assembles the sub-words to form a word and the word is read therefrom for further processing.

A first word (WORD 1) made up of sub-words 1-3 is available for reading from the data register 330 on rising edge 8 and may be read on rising edge 9. Thereafter, a valid sub-word is read and deleted from the FIFOs 320 for the remaining cycles (rising edges) of the block read. For example if the block size is 4 words, a data word is transferred from the FIFOs 320 to the data register 330 on rising edges 8 (sub-words 1-3), 9 (sub-words 4-6), 10 (sub-words 7-9) and 11 (sub-words 10-12). The four words (words 1-4) are available for processing at the output of the data register 330 in four consecutive clock cycles starting at clock edge 8 and may be read from the data register 330 in four consecutive clock cycles starting at clock edge 9.

Figure 5B:
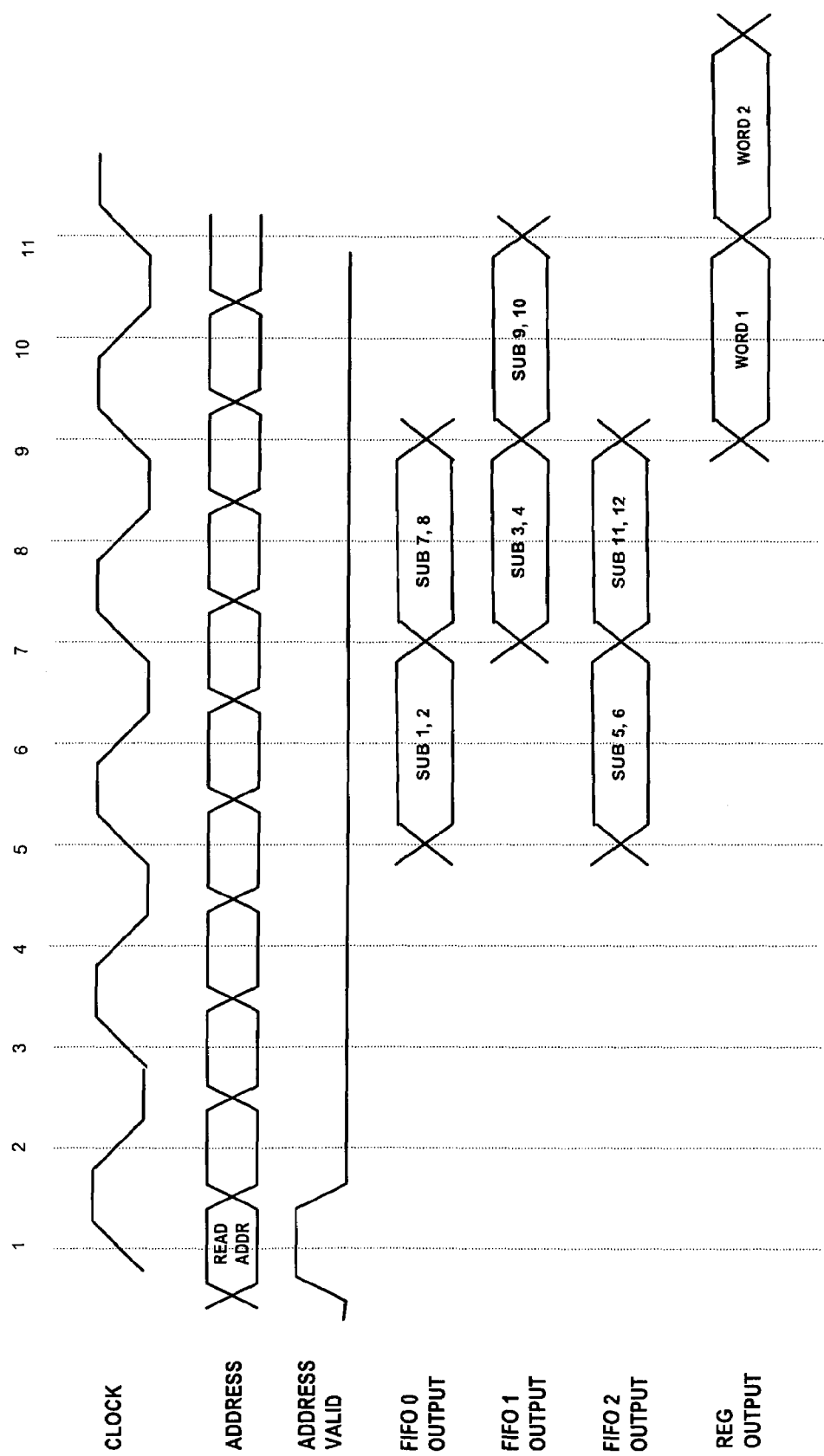

FIG. 5B illustrates an example timing diagram for a read operation of the system of FIG. 3, assuming that the memory device is a dual-edge clocking (DDR/QDR) device with three memory banks. As illustrated, the first and second sub-words (SUB 1 and 2) from the first memory device are available at an output of FIFO 0 on clock edge 5, the third and fourth sub-words (SUB 3 and 4) from the second memory device are available at an output of FIFO 1 on clock edge 7, and the fifth and sixth sub-words (SUB 5 and 6) from the third memory device are available at an output of FIFO 2 on clock edge 5. Thus, the sub-words making up a first word are available at the output of the FIFOs 320 at edge 7 (rising edge) and are clocked into the data register 330 by edge 9. The register 330 assembles the sub-words to form a word and the word is read therefrom for further processing.

A first word (WORD 1) made up of sub-words 1-6 is available at the output of the data register 330 on edge 9 and may be read on rising edge 11. Thereafter, two valid sub-words are read and deleted from each of the FIFOs 320 for the remaining cycles (rising edges) of the block read. For example, a second word (WORD 2) made up of sub-words 7-12 would be available at the FIFOs 320 on clock edge 9 and would be clocked into the data register 330 and deleted from the FIFOs 320 on edge 11. The second word would be available in the data register 330 for processing in the clock cycle starting at edge 11 and could be read therefrom on edge 13.

Figure 6:
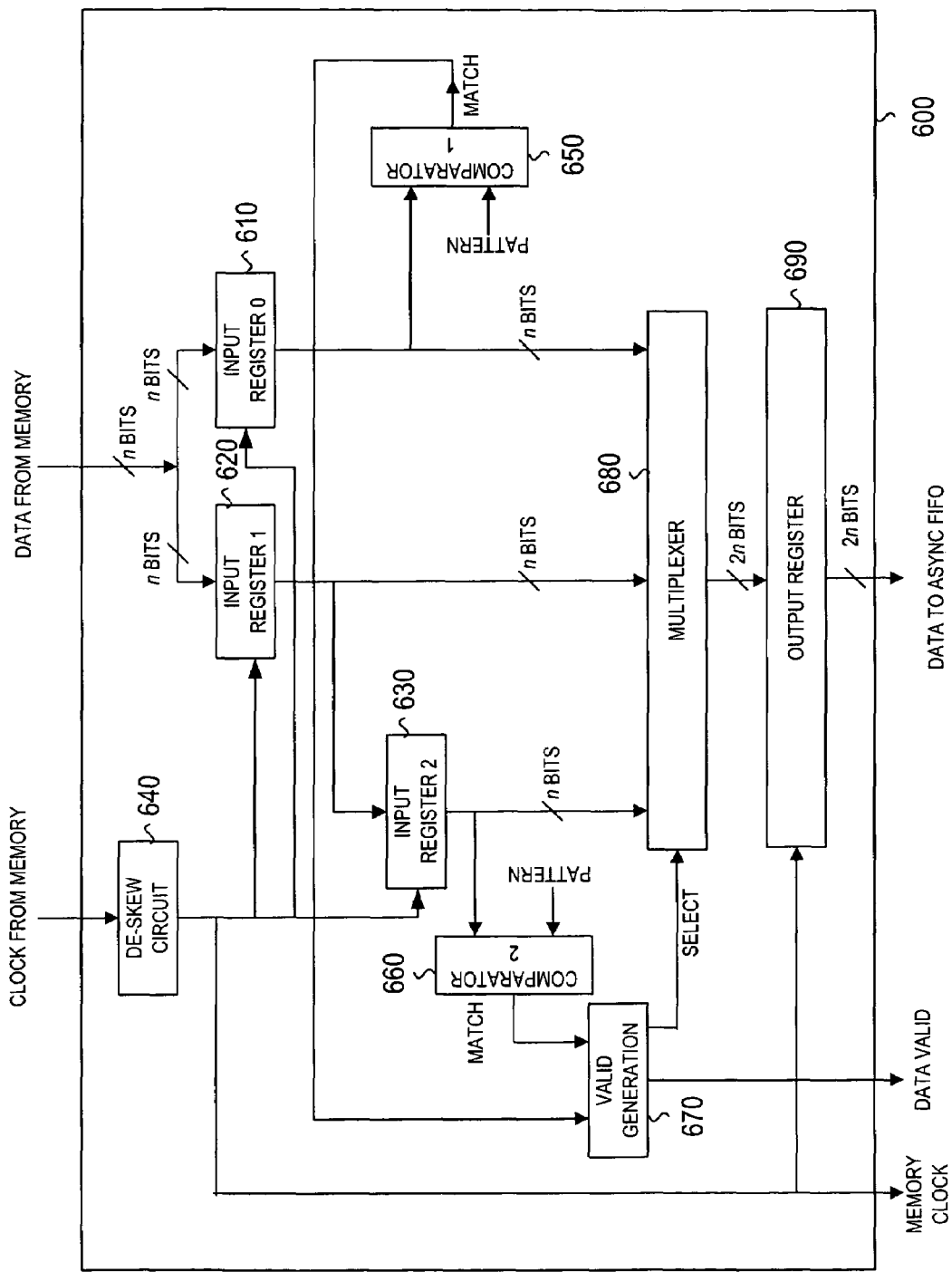
FIG. 6 illustrates a detailed block diagram of an example read interface block, according to one embodiment.

FIG. 6 illustrates a detailed block diagram of an example read interface block 600 (e.g., 340 of FIG. 3) receiving data from a memory with dual-edge clocking (one sub-word per clock edge) consisting of a single bank. The read interface block 600 includes three input registers 610, 620, 630, a de-skew circuit 640, two comparators 650, 660, a valid generator 670 and multiplexer 680, and an output register 690. A data bus for forwarding the sub-words from the memory device is connected to each of a pair of input registers 610, 620. An incoming clock from the memory device is received by the de-skew circuit 640, which corrects for any skew between the incoming clock and the data sub-word from the corresponding memory device. The aligned clock is provided to the input registers 610, 620, 630 and the output register 690. This clock is also connected to the write clock input of a FIFO (e.g., 320 of FIG. 3). The input register 610 may be clocked by the positive edge of the incoming clock from the memory device, while the input register 620 may be clocked by the negative edge. This allows the DDR/QDR clocking to be converted into a single-edge clocking format for use within the processing device. During a read operation, the first n-bit sub-word of data may be latched by either of the pair of input register 610, 620 depending on what edge of the clock the sub-word is received.

If the first sub-word is received on a positive edge it is latched in input register 610 and the second sub-word that is received on the falling edge is latched in input register 620. If the data is valid (discussed later), the two sub-words can be combined and are ready to be written to the FIFOs on the next rising edge.

Figure 7A:
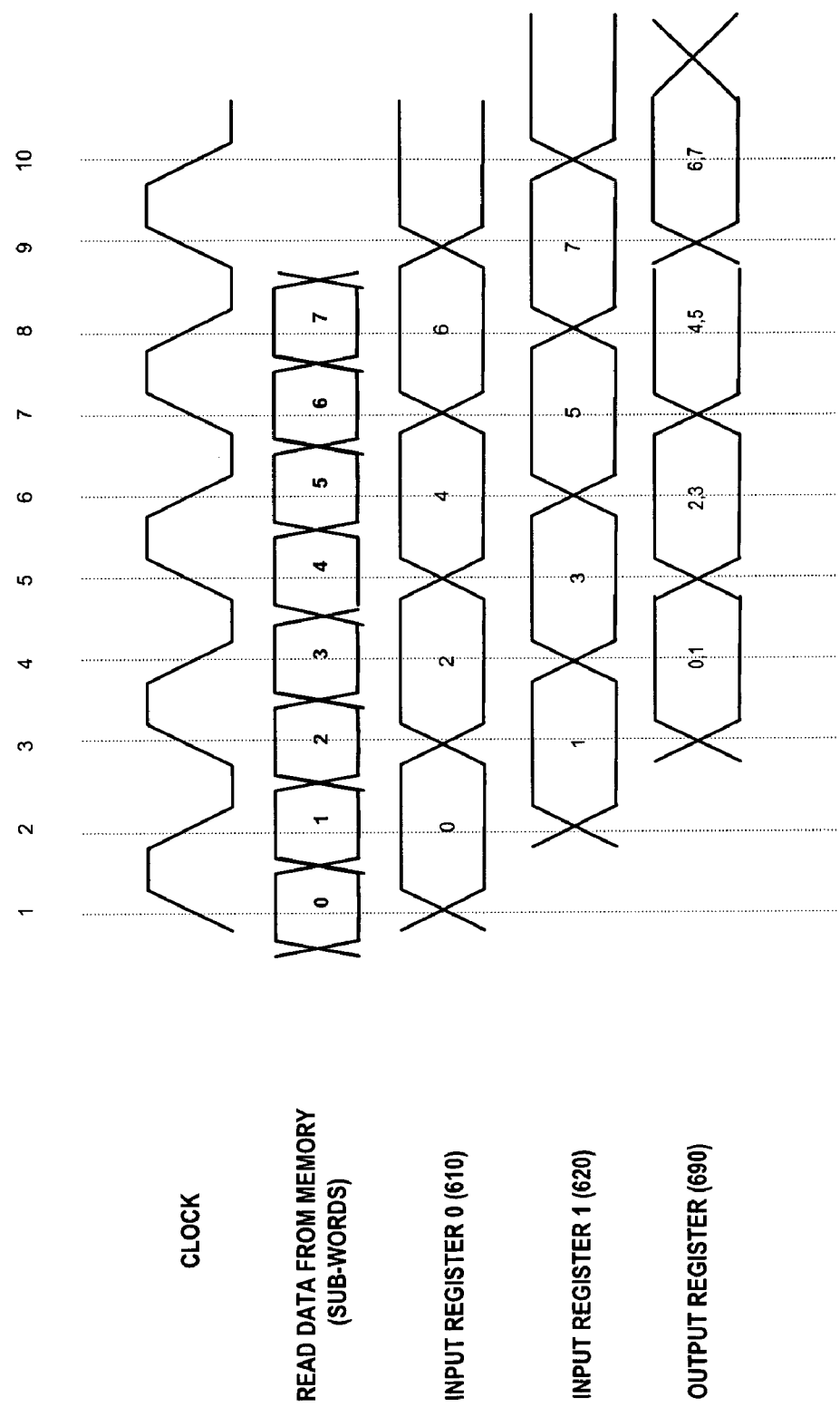
FIG. 7A illustrates an example timing diagram where a first sub-word is received on a rising edge, according to one embodiment.

FIG. 7A illustrates an example timing diagram for a read interface block (e.g., 600 of FIG. 6) where the first sub-word of the transfer is received on a rising edge (edge 1). The first sub-word (0) is clocked into input register 0 (e.g., 610) on edge 1 (rising edge), the next sub-word (1) arrives on clock edge 2 (negative edge) and is clocked into input register 1 (e.g., 620). The remaining sub-words received on the rising edge are clocked in register 0 and the remaining sub-words received on the falling edge are clocked into register 1. The outputs of registers 0 and 1 are concatenated into a single 2n-bit word and written to an output register (e.g., 690) on the next positive edge, for transfer into the FIFO (e.g., 320 of FIG. 3). For example, sub-words 0 and 1 would be written to the output register on edge 3 (rising edge), and sub-words 2 and 3 would be written on edge 5 (rising edge).

Referring back to FIG. 6, if the first sub-word is received on a falling edge it is latched into input register 620 and the second sub-word that is received on the rising edge is latched into input register 610. Since the data is provided to the FIFO on the next rising edge after both sub-words are received the data in input register 620 needs to be moved to input register 630 because input register 620 will receive a new sub-word on the next falling edge. On the next positive edge of the clock the sub-words from registers 630, 610 are combined and written into the output register 690, ready to be written to the FIFO on the next rising edge.

Figure 7B:
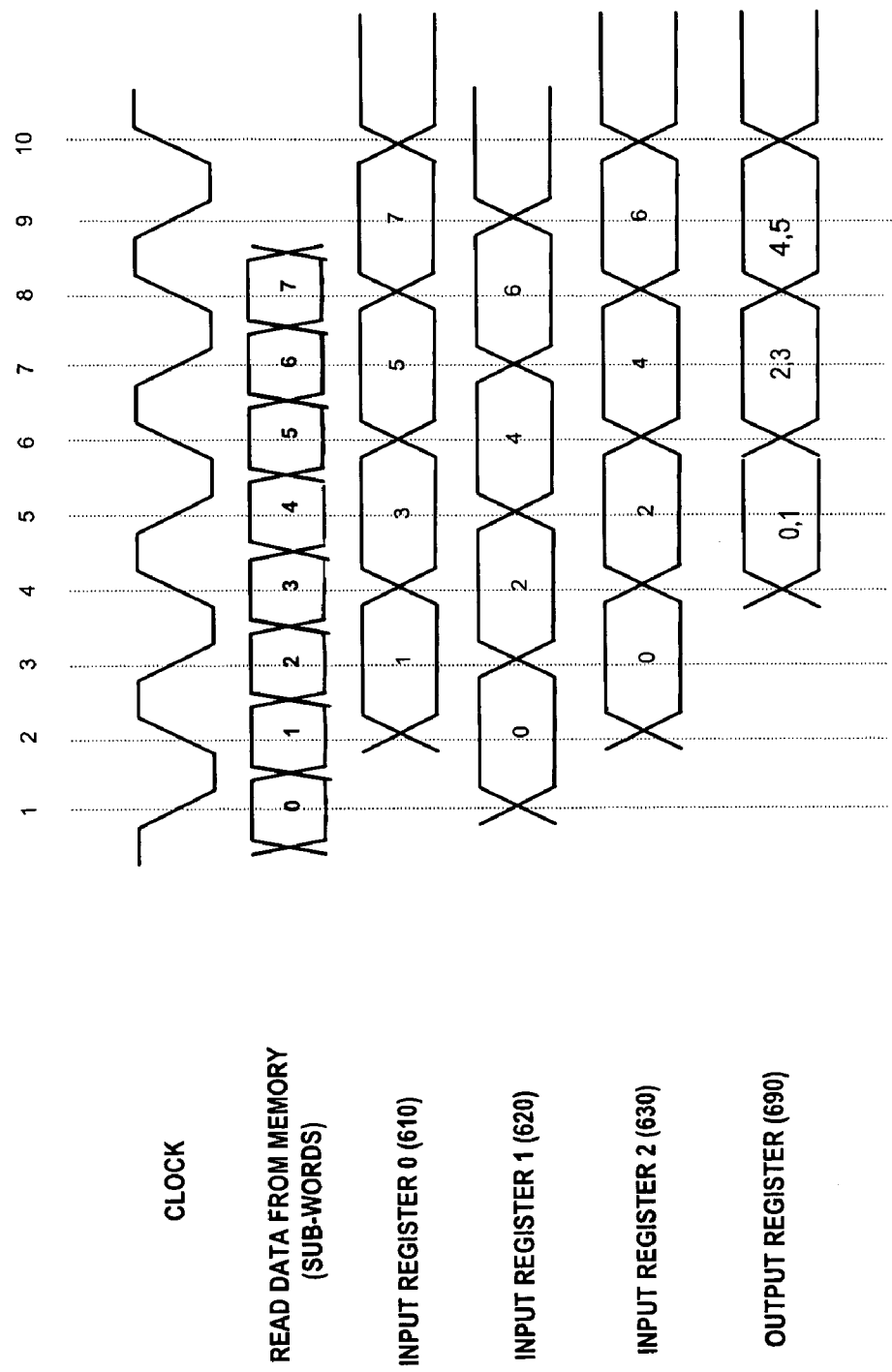
FIG. 7B illustrates an example timing diagram where a first sub-word is received on a falling edge, according to one embodiment.

FIG. 7B illustrates an example timing diagram for a read interface block (e.g., 600 of FIG. 6) where the first sub-word of the transfer is received on a falling edge (edge 1). The first sub-word (0) is clocked into input register 1 (e.g., 620) on edge 1 (falling edge), the next sub-word (1) arrives on clock edge 2 (rising edge) and is clocked into input register 0 (e.g., 610). Sub-word (0) is also moved from input register 1 to input register 2 (e.g., 630) on edge 2. The remaining sub-words received on the falling edge are clocked in input register 1 and then moved to input register 2 on the next rising edge and the remaining sub-words received on the rising edge are clocked into input register 0. The outputs of input registers 0 and 2 are concatenated into a single 2n-bit word and written to an output register (e.g., 690) on the next positive edge. For example, sub-word 0 received on edge 1 by register 1 is moved to register 2 on edge 2, combined with sub-word 1 received on edge 2 by register 0, and written to the output register on edge 4 (rising edge), and sub-word 2 received on edge 3 is moved to register 2 on edge 4, combined with sub-word 3, and written to the output register on edge 6 (rising edge).

Referring back to FIG. 6, during a read operation, the first sub-word received is monitored for the alignment pattern. The comparators 650, 660 monitor input register 610, 630 respectively for the alignment pattern. When the alignment pattern is detected, the match output of the corresponding comparator 650, 660 becomes active. The match signals of the two comparators 650, 660 are fed as inputs to the valid generator 670, which is responsible for generating the data valid signal for the 2n-bit output data. The valid generator 670 activates a data valid signal when one of its match inputs becomes active, thus enabling the 2n-bit data at the output to be transferred to the asynchronous FIFO on the next positive edge of the clock. It then maintains the data valid signal asserted for w/2 cycles, where w is the number of n-bit sub-words transferred during the read operation.

The valid generator 670 also controls the select input of the multiplexer 680. If the match output of the comparator 650 was active the valid generator 670 sets the multiplexer 680 to select the data from input register 610 (first sub-word) and the data from input register 620 (second sub-word) and present them together at the output as a 2n-bit sub-word. If the match output of the comparator 660 was active the valid generator 670 sets the multiplexer 680 to select the data from input register 630 (first sub-word) and the data from input register 610 (second subword) and present them together at the output as a 2n-bit sub-word. The multiplexer setting, once made, remains unchanged for the entire read transfer. The multiplexer 680 writes the appropriate 2n-bit sub-words to the output register 690.

Although this specification has been illustrated by reference to specific embodiments, it will be apparent that various alterations and modifications may be made which clearly fall within the intended scope. Reference to "one embodiment" or "an embodiment" is meant only to indicate that a particular feature, structure or characteristic described is included in at least one embodiment. Therefore, it should not be construed that all instances of the phrase "in one embodiment" refer to the same or a single embodiment.

Different implementations may feature different combinations of hardware, firmware, and/or software. It may be possible to implement, for example, some or all components of various embodiments in software and/or firmware as well as hardware, as known in the art. Embodiments may be implemented in numerous types of hardware, software and firmware known in the art, for example, integrated circuits, including ASICs and other types known in the art, printed circuit broads, components, etc.

The various embodiments are intended to be protected broadly within the spirit and scope of the appended claims.

What is claimed is:

1. A processing device, comprising
a plurality of read interface blocks to receive a data block from a plurality of associated memory banks in parallel and to dynamically detect boundaries for associated portions of the data block read by detecting an alignment pattern in data received from the memory banks;
a plurality of asynchronous FIFO to receive the data block from associated said plurality of read interface blocks and to forward the data block for further processing based on an internal clock, wherein each of said plurality of asynchronous FIFOs activate a valid signal when at least one sub-word is contained therein;
a logical AND to receive the FIFO valid signals from said asynchronous FIFOs; and
a data register, responsive to said logical AND, to read sub words from said asynchronous FIFOs based on the internal clock.

2. The processing device of claim 1, wherein said plurality of read interface blocks may have different boundaries for the associated portions of the data block.

3. The processing device of claim 2, wherein after the boundary of an associated portion is detected for a read interface block said read interface block will write subwords it receives that are part of the associated portion of the data block to an associated asynchronous FIFO based on an associated clock received from the associated memory bank.

4. The processing device of claim 1, wherein the plurality of associated memory banks are single-edge clocking memory banks.

5. A processing device, comprising
a plurality of read interface blocks to receive a data block from a plurality of associated memory banks in parallel and to dynamically detect boundaries for associated portions of the data block read by detecting an alignment pattern in data received from the memory banks;
a plurality of asynchronous FIFO to receive the data block from associated said plurality of read interface blocks and to forward the data block for further processing based on an internal clock, wherein the plurality of associated memory banks are dual-edge clocking memory banks, and wherein said plurality of read interface blocks include a plurality of registers to convert dual-edge clocking to single-edge clocking.

6. The processing device of claim 5, wherein said plurality of read interface blocks receive two sub-words per clock cycle and combine the two sub-words and forward the combined sub-word to associated plurality of asynchronous FIFOs.

7. A system comprising
a pipelined dual-edge clocking memory device to store data blocks, wherein the memory device includes a plurality of memory banks; and
a processing device configured to read data blocks from the plurality of memory banks in parallel, wherein said processing device dynamically detects boundaries for associated portions of the data block read by detecting an alignment pattern in data received from the memory banks, and wherein said processing device dynamically aligns the data block received from the plurality of memory banks with an internal clock, and wherein said processing device includes
a plurality of read interface blocks to receive an associated portion of the data block from the plurality of associated memory banks in parallel and to dynamically detect boundaries for the associated portions by detecting the alignment pattern in data received from the memory banks;
a plurality of asynchronous FIFOs to receive the associated portion of the data block from the associated read interface blocks and to forward the data block for further processing based on an internal clock, wherein each of the plurality of asynchronous FIFOs set a FIFO valid signal when at least one sub-word is contained therein;
a logical AND to receive the FIFO valid signals from said asynchronous FIFOs; and
a data register, responsive to said logical AND, to read sub words from said asynchronous FIFOs based on the internal clock.

8. A processing device, comprising
an internal clock;
a plurality of read interface blocks, associated with a plurality of memory banks of a banked memory device, to receive a data block for a given address from the banked memory device, wherein the data block is received as a plurality of subwords and corresponding incoming clock signals, wherein the read interface blocks determine received data is associated with the data block by detecting an alignment pattern in the received subwords; and
a plurality of asynchronous FIFO, associated with the plurality of read interface blocks, to receive the subwords associated with the data block from the associated read interface blocks based on the corresponding incoming clock signals, and to forward the associated subwords based on the internal clock; and a data register to receive the subwords from the plurality of asynchronous FIFO and to combine the subwords into a word and forward the word for further processing based on the internal clock.

9. The processing device of claim 8, wherein the data register begins combining the subwords once at least one subword has been received by each of the plurality of asynchronous FIFOs.

10. The processing device of claim 8, further comprising a logical AND to receive FIFO valid signals from the asynchronous FIFOs, wherein the plurality of asynchronous FIFOs activate the valid signal when at least one sub-word is contained therein, and wherein the data register is responsive to the logical AND and the internal clock.

11. The processing device of claim 8, wherein the banked memory device is single-edged.

12. The processing device of claim 8, wherein the banked memory device is dual-edged, and wherein the plurality of read interface blocks include a plurality of registers to convert dual-edge clocking to single-edge clocking.

13. The processing device of claim 12, wherein the plurality of read interface blocks receive two sub-words per clock cycle and combine the two sub-words and forward the combined sub-word to the associated asynchronous FIFOs.

* * * * *